(12) United States Patent
Yang et al.

(10) Patent No.: US 7,701,736 B2
(45) Date of Patent: Apr. 20, 2010

(54) SYNCHRONOUS RECTIFYING CIRCUIT FOR RESONANT POWER CONVERTERS

(75) Inventors: Ta-yung Yang, Milpitas, CA (US); Tso-Min Chen, Taichung (TW)

(73) Assignee: System General Corp., Taipei Hsien (TW)

( * ) Notice: Subject to any disclaimer, the term of this patent is extended or adjusted under 35 U.S.C. 154(b) by 286 days.

(21) Appl. No.: 11/835,807

(22) Filed: Aug. 8, 2007

(65) Prior Publication Data
US 2009/0040792 A1 Feb. 12, 2009

(51) Int. Cl.
*H02M 7/04* (2006.01)
(52) U.S. Cl. ......................... 363/89; 363/127
(58) Field of Classification Search ............... 363/21.05, 363/21.07, 21.12, 53, 80, 81, 89, 49, 56.01, 363/72; 323/282–288, 272, 276
See application file for complete search history.

(56) References Cited

U.S. PATENT DOCUMENTS

| | | | | |
|---|---|---|---|---|
| 4,922,404 A | * | 5/1990 | Ludwig et al. ................. | 363/89 |
| 5,841,641 A | * | 11/1998 | Faulk ...................... | 363/21.14 |
| 7,173,835 B1 | | 2/2007 | Yang | |
| 2002/0135342 A1 | | 9/2002 | Tomioka ..................... | 323/282 |
| 2005/0024899 A1 | | 2/2005 | Yang ....................... | 363/21.15 |

FOREIGN PATENT DOCUMENTS

| | | |
|---|---|---|
| CN | 1697296 | 11/2005 |
| JP | 2001-069756 | 3/2004 |
| JP | 2005-20970 | 1/2005 |

* cited by examiner

*Primary Examiner*—Rajnikant B Patel
(74) *Attorney, Agent, or Firm*—J.C. Patents

(57) ABSTRACT

A synchronous rectifying circuit is provided for resonant power converter. An integrated synchronous rectifier comprises a rectifying terminal, a ground terminal a first input terminal and a second input terminal. The rectifying terminal is coupled to the secondary side of a power transformer. The ground terminal is coupled to the output of the power converter. A power transistor is connected between the rectifying terminal and the ground terminal. The first input terminal and the second input terminal are coupled to receive a pulse signal for turning on/off the power transistor. A pulse-signal generation circuit includes an input circuit coupled to receive the switching signal for switching the power transformer of the power converter.

21 Claims, 6 Drawing Sheets

SYNCHRONOUS RECTIFYING CIRCUIT FOR RESONANT POWER CONVERTERS

BACKGROUND OF THE INVENTION

1. Field of Invention

The present invention relates in general to a control circuit of power converter, and more particularly, to synchronous rectifying control circuit for power converters.

2. Description of Related Art

FIG. 1 shows a circuit schematic of an offline resonant power converter. It includes a power transformer 10 to provide isolation from AC line input to the output of the power converter for safety. The soft switching of the resonant power converter achieves high efficiency and low EMI (electric-magnetic interference) performance. Transistors 20 and 30 develop a half bridge circuit to switch a resonant tank. The resonant tank is formed by the power transformer 10, an inductor 15 and a capacitor 40. The inductor 15 acts as a primary-side leakage inductance of the power transformer 10 and/or an inductor device. The inductance L of the inductor 15 and the capacitance C of the capacitor 40 determine the resonance frequency $f_0$.

$$f_0 = \frac{1}{2\pi\sqrt{L \times C}} \quad (1)$$

The power transformer 10 transfers the energy from the primary side to the secondary side of the power transformer 10. Rectifiers 41 and 42 rectify the switching voltage of the power transformer 10 into a capacitor 65. A DC voltage $V_O$ is thus outputted at the output terminal of the power converter. The output load of the power converter determines the Q value of the resonant tank through the power transformer 10. FIG. 2 shows the normalized amplitude of the output power as a function of the switching frequency. The maximum power is delivered to the output terminal of the power converter when the switching frequency is operated at the resonant frequency $f_0$. If the switching frequency is lower than the resonant frequency $f_0$, then the resonant tank will become capacitive impedance. The resonant tank will become inductive impedance when the switching frequency is operated higher than the resonant frequency $f_0$. The voltage-controlled oscillator (VCO) of the power converter will control the switching frequency in between the resonant frequency $f_0$ and the maximum frequency $f_M$ to ensure the feedback circuit of the power converter is operated under a linear system. Besides, controlling the switching frequency below the maximum frequency $f_M$ is to make sure a soft switching mechanism. The detail skill of the resonant power converter can be found in text book "Resonant Power Converters" by Marian K. Kazimierczuk and Dariusz Czarkowski, 1995 by John Wiley & Sons, Inc.

In recent development, applying the synchronous rectifier on the secondary side of the power transformer is a further approach to achieve a higher efficiency power conversion, such as "Control circuit associated with saturable inductor operated as synchronous rectifier forward power converter" by Yang, U.S. Pat. No. 7,173,835. However, the disadvantage of this prior art is an additional power consumptions caused by saturable inductors, etc. The object of present invention is to provide a synchronous rectifying circuit for resonant power converters to achieve higher efficiency.

SUMMARY OF THE INVENTION

A synchronous rectifying circuit is developed to improve the efficiency of the resonant power converter. The synchronous rectifying circuit includes a pulse-signal generation circuit for generating a pulse signal in response to the rising edge and the falling edge of a switching signal. The switching signal is utilized to switch a power transformer and regulate the power converter. An isolation device, such as a pulse transformer or capacitors, is coupled to the pulse-signal generation circuit to transfer the pulse signal from the primary side of the power transformer to the secondary side of the power transformer. An integrated synchronous rectifier comprises a rectifying terminal, a ground terminal a first input terminal and a second input terminal. The rectifying terminal is coupled to the secondary side of a power transformer. The ground terminal coupled to the output of the power converter. A power transistor is connected between the rectifying terminal and the ground terminal. The first input terminal and the second input terminal are coupled to receive the pulse signal for turning on/off the power transistor. The pulse signal is a trig signal. The pulse width of the pulse signal is shorter than the pulse width of the switching signal.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF EMBODIMENTS

Figure 1:
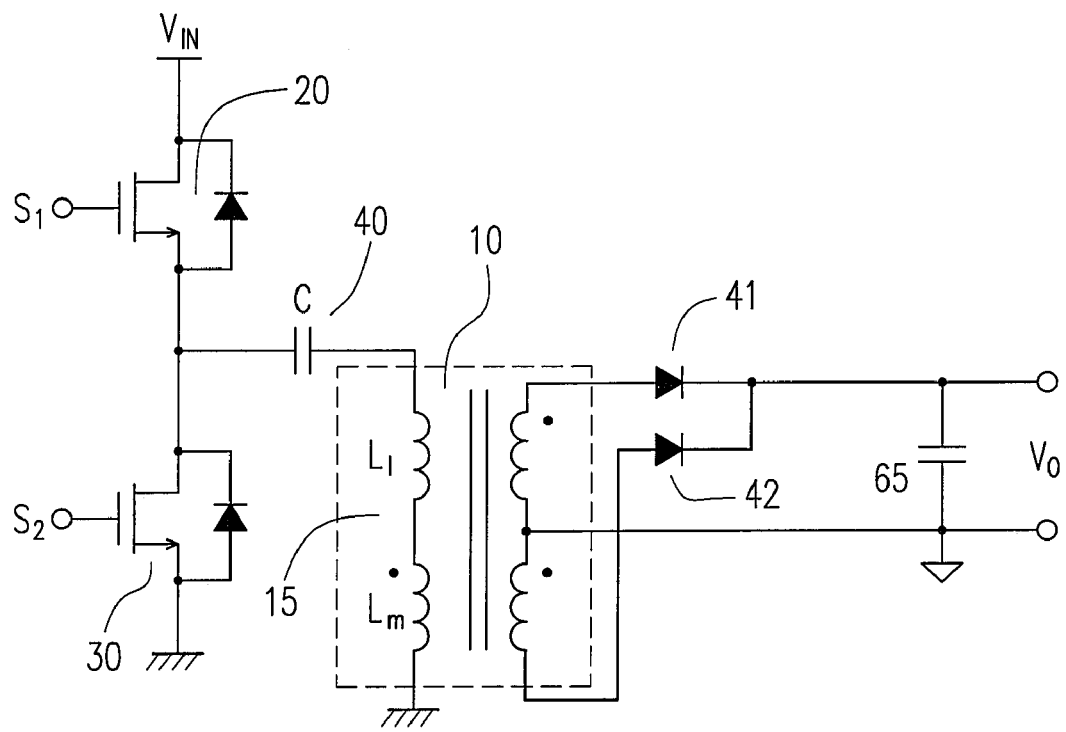
FIG. 1 shows a circuit schematic of an offline resonant power converter.
Figure 2:
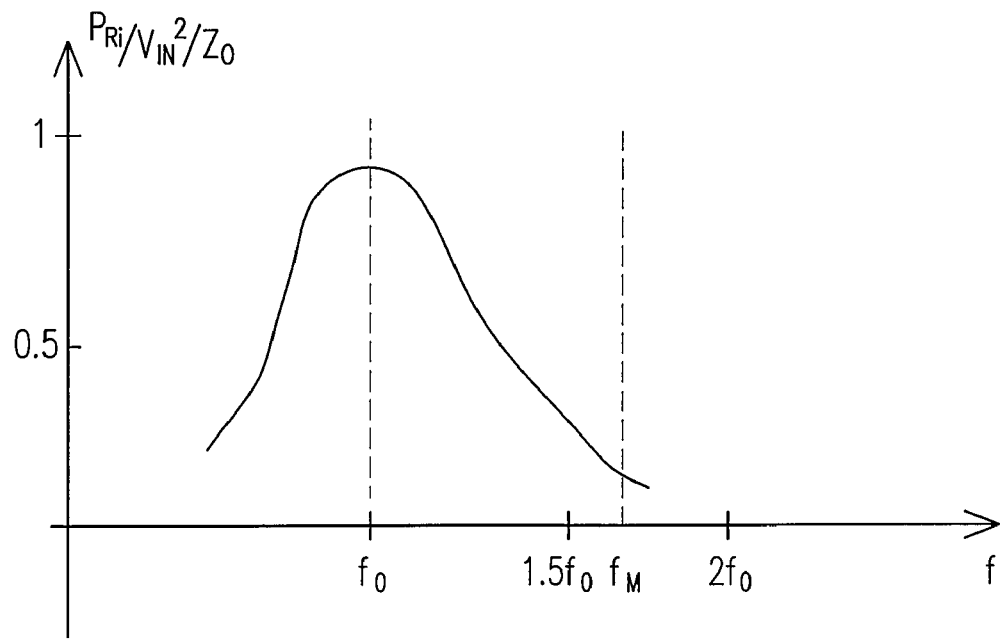
FIG. 2 shows a normalized amplitude of the output power of the resonant power converter as a function of the switching frequency.
Figure 3:
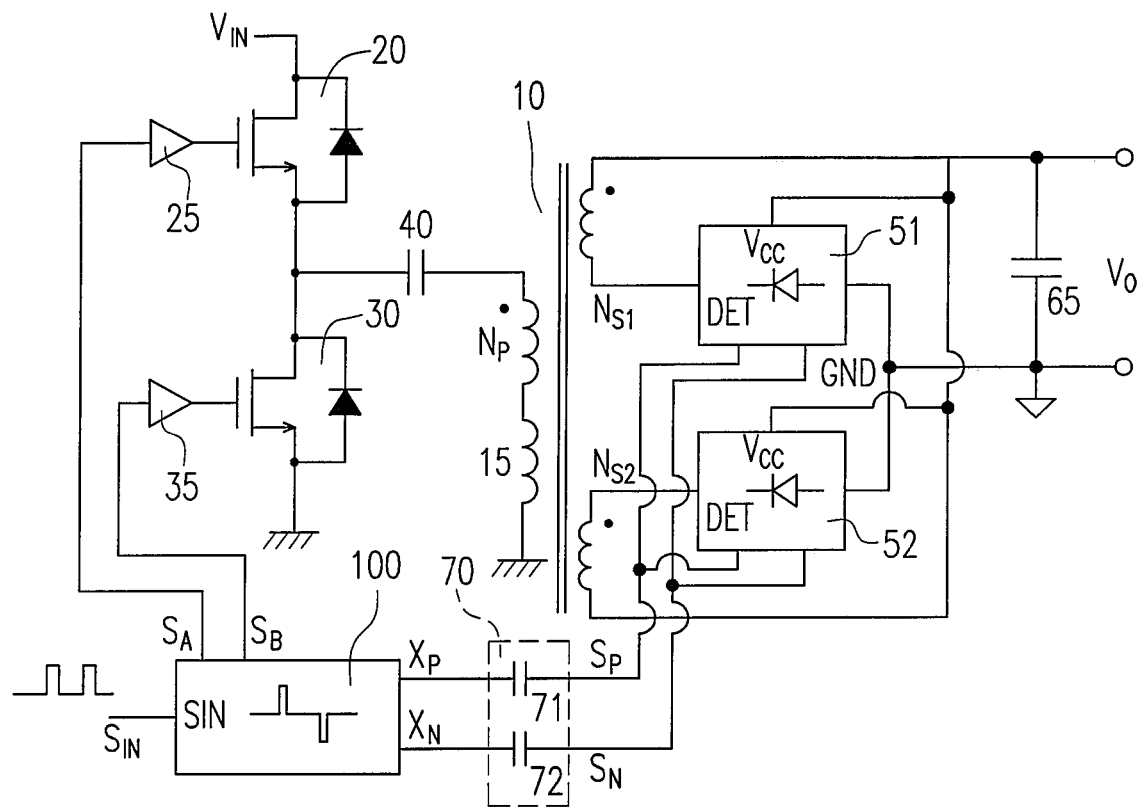
FIG. 3 shows an embodiment of the resonant power converter with integrated synchronous rectifier according to the present invention.

FIG. 3 shows a resonant power converter with integrated synchronous rectifiers. The resonant power converter includes a power transformer 10 having a primary side and a secondary side. The primary side of the power transformer 10 comprises two power switches 20 and 30 for switching the primary winding $N_P$ of the power transformer 10. The secondary side includes a secondary winding $N_{S1}$ and another secondary winding $N_{S2}$. A first integrated synchronous rectifier 51 comprises a rectifying terminal DET connected to the secondary winding $N_{S1}$. A ground terminal GND of the first integrated synchronous rectifier 51 is connected to the ground of the power converter. A second integrated synchronous rectifier 52 having the rectifying terminal DET and the ground terminal GND is also connected from the secondary winding $N_{S2}$ to the ground of the power converter. A first input terminal $S_P$, a second input terminal $S_N$ of the first integrated synchronous rectifier 51 and the second integrated synchronous rectifier 52 are connected to the secondary side of an isolation device 70 to receive a pulse signal for turning on or turning off the integrated synchronous rectifiers 51 and 52. The isolation device 70 can be composed of capacitors 71 and 72, or can be a pulse transformer. The capacitance of capacitors 71 and 72 can be small, such as 20 pF, but high-voltage rating of capacitors is required for the isolation.

A pulse-signal generation circuit 100 comprises an input signal terminal SIN that is coupled to receive a switching signal $S_{IN}$ for generating the pulse signal in response to the rising (leading) edge and the falling (trailing) edge of the switching signal $S_{IN}$. The switching signal $S_{IN}$ is developed to switch the power transformer 10 and regulate the power converter. The pulse signal is produced on a first output terminal $X_P$ and a second output terminal $X_N$ of the pulse-signal generation circuit 100. The pulse signal is a differential signal. The polarity of the pulse signal determines turning on or turning off of the integrated synchronous rectifiers 51 and 52. In order to produce the pulse signal before the power transformer 10 is switched, the pulse-signal generation circuit 100 further generates drive signals $S_A$ and $S_B$ in response to the switching signal $S_{IN}$. The drive signals $S_A$ and $S_B$ are coupled to control power switches 20 and 30 through drive circuits 25 and 35 respectively. A time delay is developed between the enabling of the switching signal $S_{IN}$ and the enabling of the drive signals $S_A$ and $S_B$.

The first output terminal $X_P$ and the second output terminal $X_N$ of the pulse-signal generation circuit 100 are coupled to the isolation device 70 to transfer the pulse signal from the primary side of the power transformer 10 to the secondary side of the power transformer 10. The pulse width of the pulse signal is shorter than the pulse width of the switching signal $S_{IN}$. The pulse signal is a trig signal that includes high frequency elements. Therefore, only small capacitors or a small pulse transformer is required for the isolation device 70, which save the space of the PCB and save the cost of the power converter.

Figure 4:
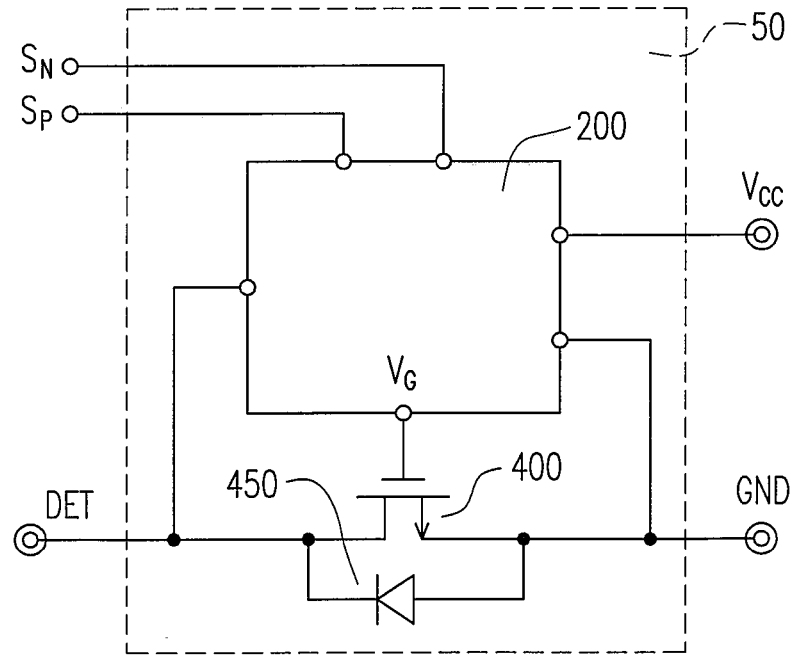
FIG. 4 is a schematic diagram of an integrated synchronous rectifier according to an embodiment of the present invention.

FIG. 4 is a schematic diagram of a preferred embodiment of an integrated synchronous rectifier 50. It represents the circuit of integrated synchronous rectifiers 51 or 52. The integrated synchronous rectifier 50 includes a power transistor 400, a diode 450 and a control circuit 200. The diode 450 is connected to the power transistor 400 in parallel. The power transistor 400 is connected between the rectifying terminal DET and the ground terminal GND. The rectifying terminal DET is coupled to the secondary side of the power transformer 10. The ground terminal GND is normally coupled to the output of the power converter. The control circuit 200 is coupled to receive the pulse signal via the first input terminal $S_P$ and the second input terminal $S_N$ for turning on or turning off the power transistor 400. A $V_{CC}$ terminal is utilized to supply the power source to the control circuit 200.

Figure 5:
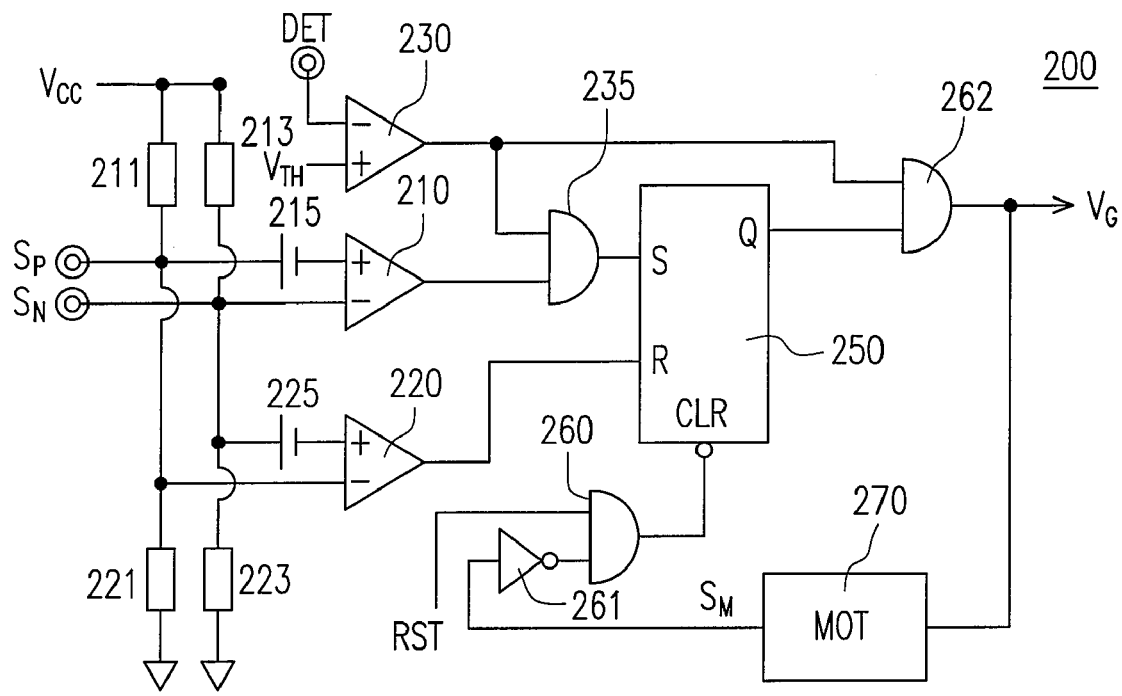
FIG. 5 is an embodiment of a control circuit of the integrated synchronous rectifier according to the present invention.

FIG. 5 shows a schematic diagram of a preferred embodiment of the control circuit 200. Resistors 211 and 221 provide a bias termination for the first input terminal $S_P$. Resistors 213 and 223 provide another bias termination for the second input terminal $S_N$. The first input terminal $S_P$ is coupled to the positive input of a comparator 210 and the negative input of a comparator 220. The second input terminal SN is coupled to the positive input of a comparator 220 and the negative input of a comparator 210. Comparators 210 and 220 comprise offset voltages 215 and 225 respectively, which produces hysteresis. A third comparator 230 having a threshold $V_{TH}$ connects to its positive input. The negative input of the comparator 230 is coupled to the rectifying terminal DET. The outputs of comparators 210 and 230 are coupled to the set-input terminal ("S") of a SR flip-flop 250 through an AND gate 235. The reset-input terminal ("R") of the SR flip-flop 250 is controlled by the output of the comparator 220. The output of the SR flip-flop 250 and the output of the comparator 230 are connected to an AND gate 262. A gate-drive signal $V_G$ is generated at the output of the AND gate 262 for controlling the being turned on or being turned off status of the power transistor 400. The maximum-on-time of the gate-drive signal $V_G$ is limited by a maximum-on-time circuit (MOT) 270. The gate-drive signal $V_G$ is connected to the maximum-on-time circuit 270. After a blanking time, a maximum-on-time signal $S_M$ will be produced in response to the enabling of the gate-drive signal $V_G$. The maximum-on-time signal $S_M$ is connected to an AND gate 260 via an inverter 261. Another input of the AND gate 260 is connected to a power-on reset signal RST. The output of the AND gate 260 is coupled to the clear terminal ("CLR") of the SR flip-flop 250 to clear (reset) the SR flip-flop 250. The maximum-on-time of the gate-drive signal $V_G$ is thus limited by the blanking time of the maximum-on-time circuit 270. The gate-drive signal $V_G$ will turn off the power transistor 400 once the pulse signal is generated as, $$V_{SN} - V_{SP} > V_{225} \quad (2)$$

The gate-drive signal $V_G$ will turn on the power transistor 400 when equations (2) and (3) are met, $$V_{SP} - V_{SN} > V_{215} \quad (3)$$

$$V_{DET} < V_{TH} \quad (4)$$

Where $V_{SP}$ is the voltage of the first input terminal $S_P$; $V_{SN}$ is the voltage of the second input terminal $S_N$. $V_{DET}$ is the voltage of the rectifying terminal DET. $V_{TH}$ is the voltage of the threshold VTH; $V_{215}$ is the value of the offset voltage 215; $V_{225}$ is the value of the offset voltage 225.

The voltage of the rectifying terminal DET will be lower than the voltage of the threshold VTH once the diode 450 is conducted. It shows the power transistor 400 can only be turned on after the diode is turned on.

Figure 6:
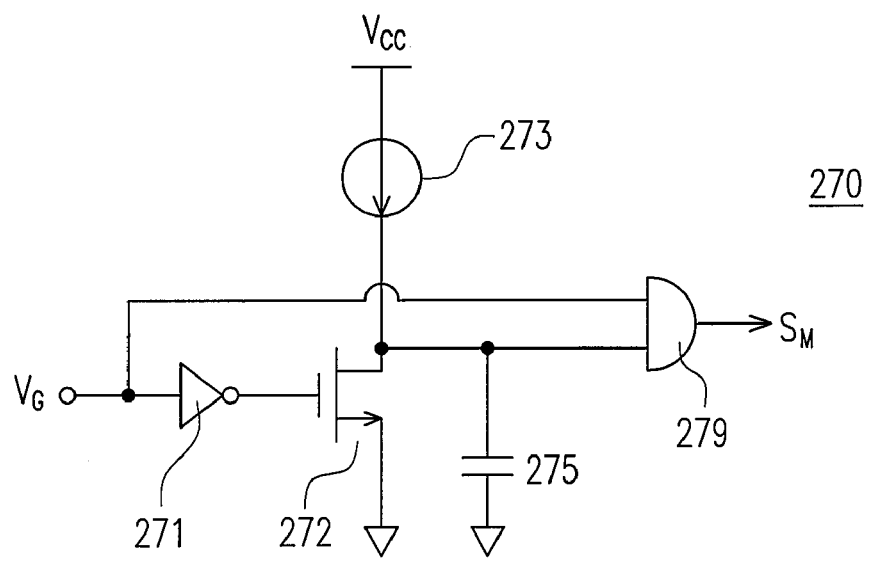
FIG. 6 is a maximum-on-time (MOT) circuit according to an embodiment of the present invention.

FIG. 6 is a schematic diagram of a preferred embodiment of the maximum-on-time circuit 270. A current source 273 is connected to charge a capacitor 275. A transistor 272 is connected to discharge the capacitor 275. The gate-drive signal $V_G$ is coupled to control the transistor 272 through an inverter 271. The gate-drive signal $V_G$ is further connected to an AND gate 279. Another input of the AND gate 279 is coupled to the capacitor 275. Once the gate-drive signal $V_G$ is enabled, the output of the AND gate 279 will generate the maximum-on-time signal $S_M$ to disable the gate-drive signal $V_G$ after the blanking time. The blanking time is determined by the current of the current source 273 and the capacitance of the capacitor 275.

Figure 7:
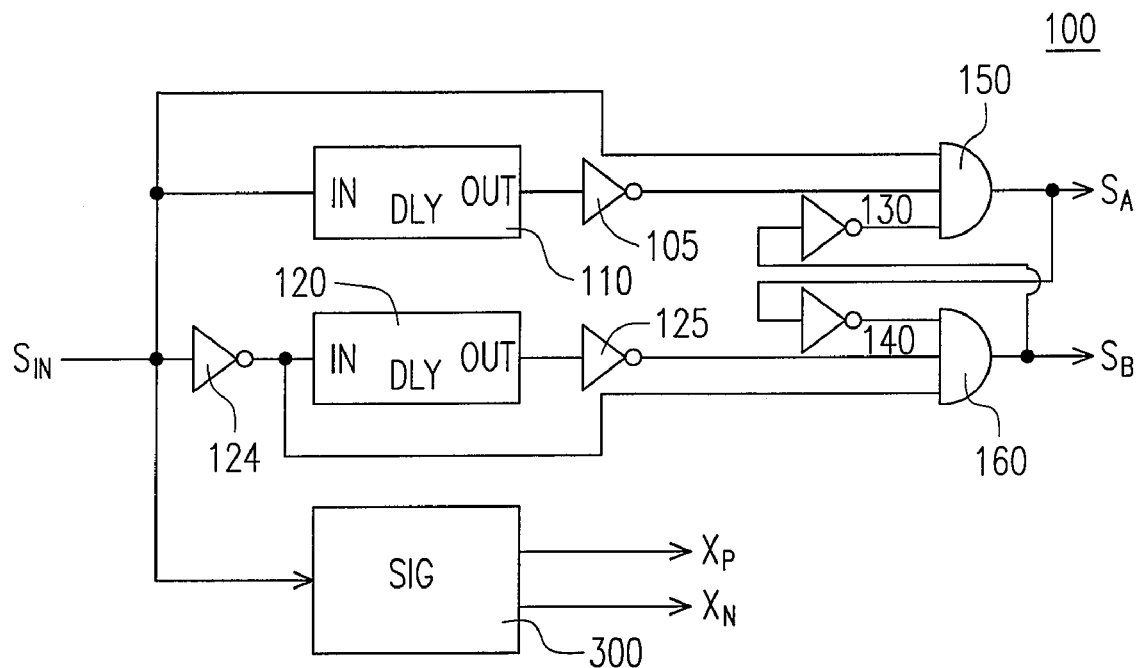
FIG. 7 is a block schematic of a pulse-signal generation circuit according to an embodiment of the present invention.

FIG. 7 is a schematic diagram of a preferred embodiment of the pulse-signal generation circuit 100. The drive signals $S_A$ and $S_B$ are generated in response to the switching signal $S_{IN}$. The switching signal $S_{IN}$ is connected to the input of a delay circuit 110. The output of the delay circuit 110 is connected to the input of an AND gate 150 through an inverter 105. Another input of the AND gate 150 is coupled to the switching signal $S_{IN}$. NAND gates 150, 160 and inverters 130 and 140 develop an anti-cross-conduction circuit to generate the drive signals $S_A$ and $S_B$. The output of the AND gate 150 is coupled to the input of anti-cross-conduction circuit. The switching signal $S_{IN}$ is further connected to the input of a delay circuit 120 through an inverter 124. The output of the delay circuit 120 is connected to the input of the AND gate 160 through an inverter 125. Another input of the AND gate 160 is coupled to the output of the inverter 124. The output of the AND gate 160 is coupled to the input of anti-cross-conduction circuit. A time delay is developed between the enabling of the switching signal $S_{IN}$ and the enabling of the drive signals $S_A$ and $S_B$. The delay circuits 110 and 120 determine the time delay.

Figure 8:
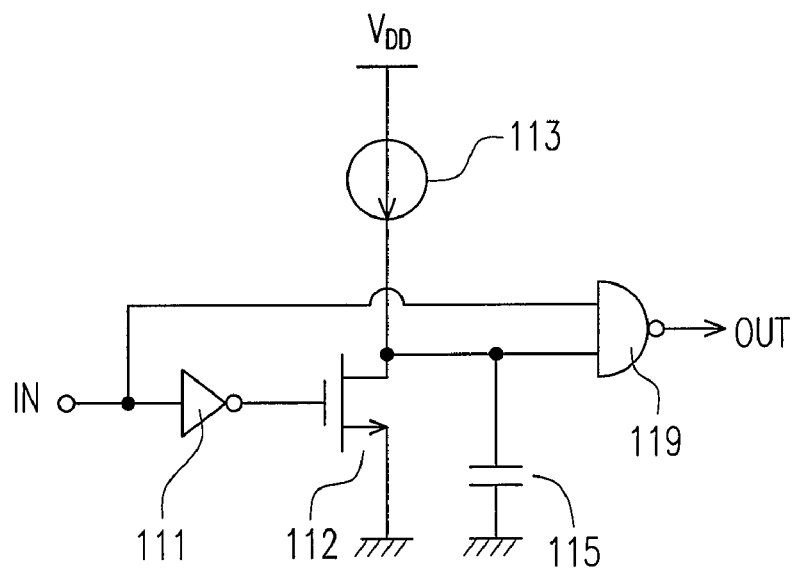
FIG. 8 show a circuit schematic of a delay circuit.

FIG. 8 shows a schematic diagram of a preferred embodiment of the delay circuit. A current source 113 is connected to charge a capacitor 115. A transistor 112 is connected to discharge the capacitor 115. The input signal is coupled to control the transistor 112 through an inverter 111. The input signal is further connected to an NAND gate 119. Another input of the NAND gate 119 is coupled to the capacitor 115. The output of the NAND gate is the output of the delay circuit. When the input signal is a logic-low, the capacitor is discharged and the output of the NAND gate 119 is the logic-high. When the input signal is changed to the logic-high, the current source 113 will start to charge the capacitor 115. The NAND gate 119 will output a logic-low once the voltage of the capacitor 115 is higher than the input threshold of the NAND gate 119. The current of the current source 113 and the capacitance of the capacitor 115 determine the delay time of the delay circuit. The delay time is started from the logic-high of the input signal to the logic-low of the output signal of the delay circuit.

Figure 9:
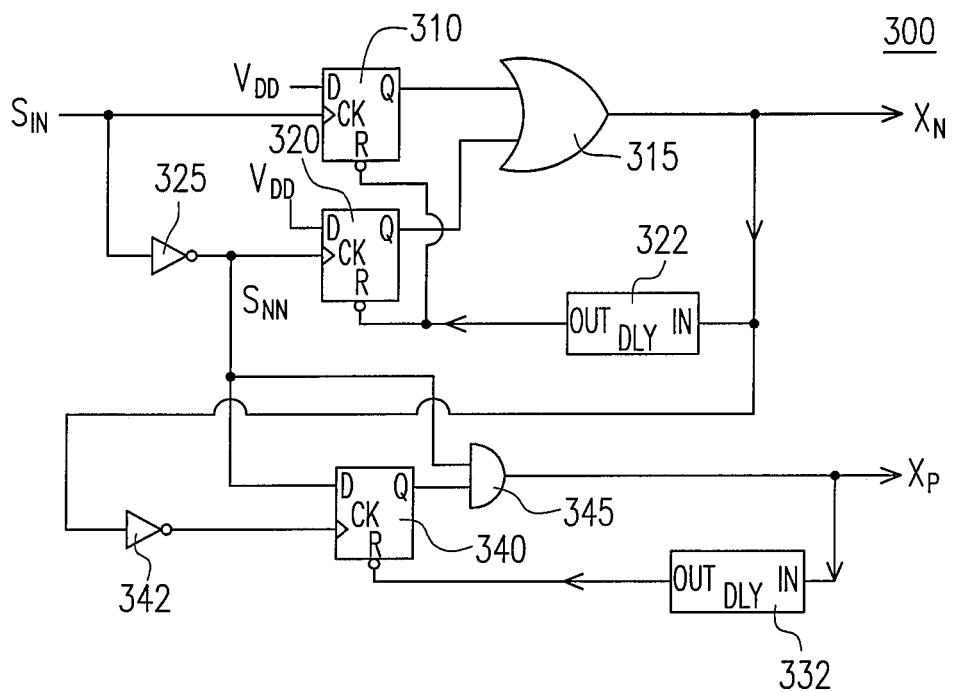
FIG. 9 is an embodiment of a signal generation circuit according to the present invention.

FIG. 9 is a schematic diagram of a preferred embodiment of the signal generation circuit 300. The clock-input of a flip-flop 310 is coupled to receive the switching signal $S_{IN}$ and generates a first signal connected to a first input of an OR gate 315. The switching signal $S_{IN}$ further generates a signal $S_{NN}$ through an inverter 325. The signal $S_{NN}$ is connected to drive the clock-input of a flip-flop 320. The flip-flop 320 outputs a second signal connected to a second input of the OR gate 315. The OR gate 315 is utilized to generate a negative-pulse signal at the second output terminal $X_N$ for turning off integrated synchronous rectifier 51 and 52 of FIG. 3. The negative-pulse signal is coupled to reset flip-flops 310 and 320 through a delay circuit (DLY) 322. The delay time of the delay circuit 322 determines the pulse width $T_P$ of the negative-pulse signal. The signal $S_{NN}$ to the D-input terminal of a flip-flop 340 and the input of an AND gate 345. Through an inverter 342, the clock-input of the flip-flop 340 is coupled to the second output terminal $X_N$ to receive the negative-pulse signal. The output of the flip-flop 340 is connected to another input of the AND gate 345. The AND gate 345 is utilized to generate a positive-pulse signal at the first output terminal $X_P$. The positive-pulse signal is coupled to reset the flip-flop 340 via a delay circuit 332. The delay time of the delay circuit 332 determines the pulse width $T_P$ of the positive-pulse signal. The pulse signal is therefore developed by the positive-pulse signal and the negative-pulse signal on the first output terminal $X_P$ and the second output terminal $X_N$.

Figure 10:
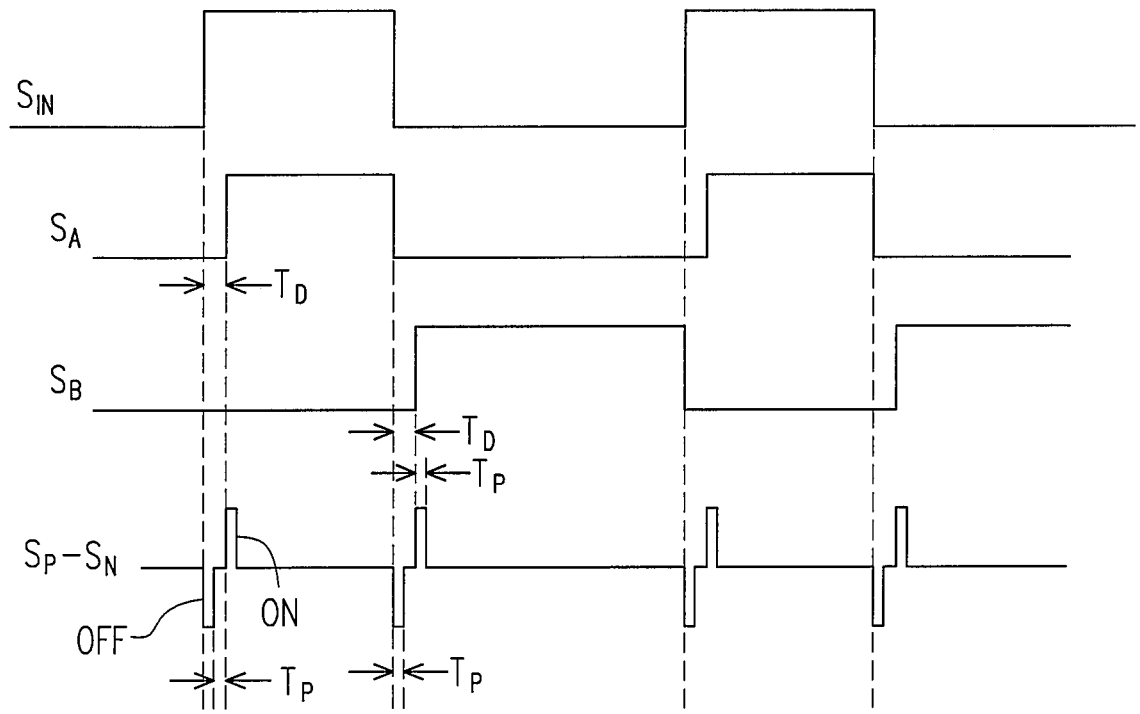
FIG. 10 shows signal waveforms of the synchronous rectifying circuit in response to the switching signal according to an embodiment of the present invention.
Figure 11:
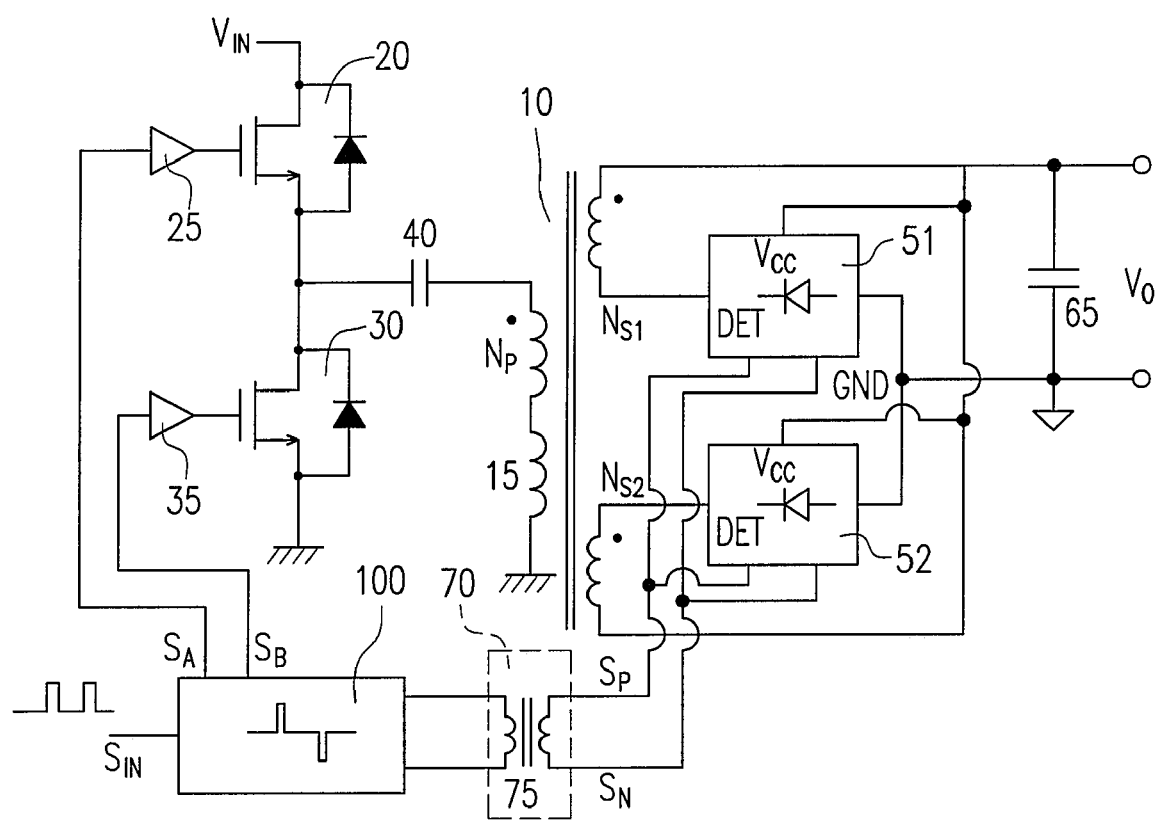
FIG. 11 shows another embodiment of the circuit schematic of a power converter with synchronous rectifier in which a pulse transformer operated as the isolation device according to the present invention.

FIG. 10 shows signal waveforms of the synchronous rectifying circuit. The drive signals $S_A$ and $S_B$ are respectively generated in response the rising edge and the falling edge of the switching signal $S_{IN}$. The delay time $T_D$ is designed in between the rising edge of the switching signal $S_{IN}$ and the rising edge of the drive signal $S_A$. Besides, another delay time $T_D$ is designed between the falling edge of the switching signal $S_{IN}$ and the rising edge of the drive signal $S_B$. The drive signal $S_B$ is the inverse of the drive signal $S_A$. A pulse signal $S_P$-$S_N$ (negative pulse signal) is generated in response to the leading edge and the trailing edge of the switching signal $S_{IN}$ to disable the integrated synchronous rectifier 51 and 52. Following the end of the negative pulse signal, a pulse signal $S_P$-$S_N$ (positive pulse signal) is generated to enable integrated synchronous rectifier 51 or 52 if the diode of the integrated synchronous rectifier 51 or 52 is conducted. FIG. 11 shows a pulse transformer 75 that is used as the isolation device 70 for synchronous rectifying circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous rectifying circuit for power converter, comprising:
    an integrated synchronous rectifier comprising:
        a rectifying terminal, coupled to a secondary side of a power transformer;
        a ground terminal, coupled to an output of the power converter;
        a first input terminal; and
        a second input terminal,
    wherein a power transistor is connected between the rectifying terminal and the ground terminal; and the first input terminal and the second input terminal are coupled to receive a pulse signal for turning on/off the power transistor; and
    a pulse-signal generation circuit comprising:
        an input circuit, coupled to receive a switching signal;
        a first output terminal; and
        a second output terminal,
    wherein the switching signal is used for switching the power transformer of the power converter; the first output terminal and the second output terminal are utilized to generate the pulse signal; and
    an isolation device, coupled between the first input terminal and the second input terminal of the integrated synchronous rectifier, and the first output terminal and the second output terminal of the pulse-signal generation circuit.

2. The synchronous rectifying circuit as claimed in claim 1, wherein the isolation device comprises a pulse transformer or capacitors.

3. The synchronous rectifying circuit as claimed in claim 1, wherein the pulse signal is a differential signal; and the polarity of the pulse signal determines on/off status of the power transistor.

4. The synchronous rectifying circuit as claimed in claim 1, wherein the pulse signal is a trig signal, and wherein a pulse width of the pulse signal is shorter than a pulse width of the switching signal.

5. The synchronous rectifying circuit as claimed in claim 1, wherein the integrated synchronous rectifier comprises a latch circuit coupled to the first input terminal and the second input terminal of the integrated synchronous rectifier to receive the pulse signal for setting or resetting the latch circuit; wherein the latch circuit is coupled to turn on/off the power transistor.

6. The synchronous rectifying circuit as claimed in claim 1, wherein the integrated synchronous rectifier further comprises a maximum-on-time circuit to limit a maximum-on-time of the power transistor.

7. A synchronous rectifier apparatus for power converter, comprising:
   a pulse-signal generation circuit, for generating a pulse signal in response to a leading edge and a trailing edge of a switching signal;
   an isolation device, coupled to transfer the pulse signal from a primary side of a power transformer to a secondary side of the power transformer; and
   an integrated synchronous rectifier, having a power transistor and a control circuit; wherein the power transistor is coupled to the power transformer for the rectifying operation; and the control circuit is operated to receive the pulse signal for turning on/off the power transistor;
   wherein a switching signal is used for switching the power transformer of the power converter; and the pulse signal is coupled to set or reset a latch circuit of the control circuit for controlling the power transistor.

8. The synchronous rectifier apparatus as claimed in claim 7, further comprising a diode coupled to the power transistor in parallel; and wherein the power transistor is turned on by the pulse signal once the diode is conducted.

9. The synchronous rectifier apparatus as claimed in claim 7, wherein the isolation device comprises capacitors or a pulse transformer.

10. The synchronous rectifier apparatus as claimed in claim 7, wherein the pulse signal is a trig signal, and wherein a pulse width of the pulse signal is shorter than a pulse width of the switching signal.

11. The synchronous rectifier apparatus as claimed in claim 7, wherein the pulse-signal generation circuit further comprises:
   an input signal terminal, coupled to receive the switching signal;
   a first output terminal;
   a second output terminal;
   wherein the pulse signal is generated at the first output terminal and the second output terminal.

12. The synchronous rectifier apparatus as claimed in claim 7, wherein the integrated synchronous rectifier comprises:
   a rectifying terminal, coupled to the secondary side of the power transformer;
   a ground terminal, coupled to the output of the power converter;
   a first input signal terminal; and
   a second input signal terminal;
   wherein the power transistor is connected between the rectifying terminal and the ground terminal; and the first input signal terminal and the second input signal terminal of the integrated synchronous rectifier are coupled to receive the pulse signal for turning on/off the power transistor.

13. The synchronous rectifier apparatus as claimed in claim 7, wherein a maximum-on-time of the power transistor is limited by a maximum-on-time circuit.

14. A method for improving efficiency of a power converter, comprising:
   generating a pulse signal in response to a leading edge and a trailing edge of a switching signal;
   transferring the pulse signal from a primary side of a power transformer to a secondary side of the power transformer through an isolation barrier;
   setting or resetting a latch in response to the pulse signal; and
   turning on/off a power transistor in accordance with a status of the latch;
   wherein a switching signal is used for switching the power transformer of the power converter; the power transistor is coupled to the secondary side of the power transformer for the rectifying operation.

15. The method for improving efficiency of a power converter as claimed in claim 14, wherein the power transistor can be turned on only when a diode is conducted, and wherein the diode is coupled to the power transistor in parallel.

16. The method for improving efficiency of a power converter as claimed in claim 14, wherein the isolation device comprises a pulse transformer or capacitors.

17. The method for improving efficiency of a power converter as claimed in claim 14, wherein a pulse width of the pulse signal is shorter than a pulse width of the switching signal.

18. The method for improving efficiency of a power converter as claimed in claim 14, wherein a maximum-on-time of the power transistor is limited by a maximum-on-time circuit.

19. A synchronous rectifying circuit for power converter, comprising:
   a first integrated synchronous rectifier coupled to a first terminal of a secondary side of a power transformer;
   a second integrated synchronous rectifier coupled to a second terminal of the secondary side of the power transformer;
   wherein the integrated synchronous rectifier comprises:
      a rectifying terminal coupled to the power transformer and a ground terminal coupled to the output of the power converter, and wherein a power transistor is connected between the rectifying terminal and the ground terminal;
      a first input terminal and a second input terminal; wherein the first input terminal and the second input terminal are coupled to receive a pulse signal for controlling the power transistor;
   a pulse-signal generation circuit comprising
      an input terminal, coupled to receive a switching signal for switching the power transformer of the power converter;
      a first output terminal and a second output terminal for generating the pulse signal; and
   an isolation device coupled in between the first input terminal and the second input terminal of the integrated synchronous rectifier, and the first output terminal and the second output terminal of the pulse-signal generation circuit.

20. The synchronous rectifying circuit as claimed in claim 19, wherein the pulse signal is a differential signal; wherein a pulse width of the pulse signal is shorter than a pulse width of the switching signal; and wherein a polarity of the pulse signal determines on/off state of the power transistor.

21. The synchronous rectifying circuit as claimed in claim 19, wherein the integrated synchronous rectifier comprises a latch circuit coupled to the first input terminal and the second input terminal to receive the pulse signal for setting or resetting the latch circuit; and wherein the latch circuit is coupled to turn on/off the power transistor.

* * * * *